Oct. 3, 1961    J. C. DUDDY    3,003,013
ELECTRIC BATTERY
Filed July 10, 1958
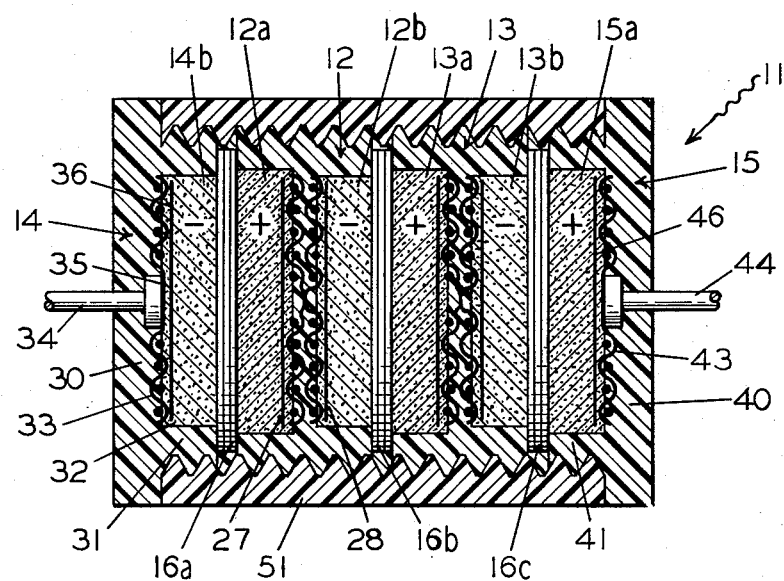
FIG. 1
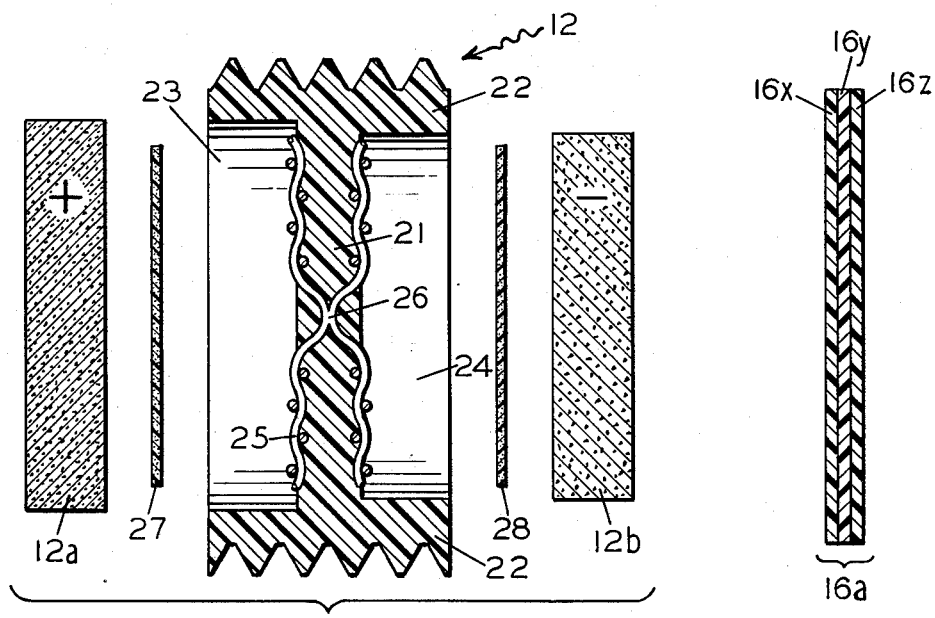
FIG. 2
FIG. 3
*INVENTOR.*
JOSEPH C. DUDDY
BY
*ATTORNEY*

United States Patent Office 3,003,013
Patented Oct. 3, 1961

3,003,013
ELECTRIC BATTERY
Joseph C. Duddy, Trevose, Pa., assignor to The Electric Storage Battery Company, a corporation of New Jersey
Filed July 10, 1958, Ser. No. 747,622
4 Claims. (Cl. 136—9)

The present invention relates to an improvement in electric batteries. More specifically, the present invention is concerned with a rechargeable battery of the pile type.

An object of the present invention is to provide a rechargeable pile type battery capable of being sealed and which is characterized by an extremely high efficiency in terms of energy available in proportion to the weight and size of the battery.

In accordance with the present invention, there is provided a compact rechargeable battery characterized by a new and improved bipolar element. The battery is shown here to be of the silver-zinc alkaline type merely for the purposes of illustration. It should be understood that the invention is not limited to any specific type of battery but is applicable to the construction of many different types of batteries, primary as well as secondary. The bipolar element employed comprises a positive electrode and a negative electrode in the form of structurized wafers of active material separated by an electrolyte impervious, electrically conductive barrier. The barrier, molded of a suitable plastic, has a rim which provides compartments on both sides of the barrier for the electrodes. The barrier is made conductive by incorporating therein a metallic grid which extends through the barrier to contact the positive and negative active materials. To augment both the conductivity and electrolyte impermeability of the barrier, a thin compressed film of thermoplastic resin, rendered highly conductive by having dispersed throughout a high percentage of finely divided metallic particles, is placed between the barrier and the respective electrodes. By means of a pressing operation at an elevated temperature, the electrodes, the films of conductive thermoplastic, and the intercell barrier are consolidated into a structurized bipolar element.

The bipolar elements thus constructed may be electrochemically formed prior to assembly into a battery, or saturated with electrolyte to be formed after assembly. For assembly into batteries, the bipolar elements are stacked with a separator between adjacent positive and negative electrodes and with suitable end cells. The entire assembly is then encapsulated in a potting compound or sealed in a suitable container.

A better understanding of the present invention may be had from the following description when read with reference to the accompanying drawing of which:

FIG. 1 is a cross sectional view of a battery embodying the present invention;

FIG. 2 is an exploded view of a bipolar element utilized in the battery shown in FIG. 1 showing the components which make up this element; and FIG. 3 is an enlarged sectional view of one of the separators utilized in the battery shown in FIG. 1.

Referring now to FIG. 1, there is shown a battery 11 embodying the present invention which comprises a plurality of bipolar elements 12 and 13 and the end cell elements 14 and 15. The bipolar element 12 has a positive electrode 12a and a negative electrode 12b. Similarly, the bipolar element 13 has a positive electrode 13a and a negative electrode 13b. The end cell element 14 has a negative electrode 14b and the end cell element 15 has a positive electrode 15a. The electrodes 14b and 12a are separated by an electrolyte permeable separator means 16a which extends outwardly from the entire periphery of the electrodes 14b and 12a. Separator means 16b and 16c are similarly provided between the electrodes 12b and 13a and between the electrodes 13b and 15a.

The positive and negative electrodes of each of the bipolar elements are separated by an electrolyte impermeable but electrically conductive barrier. This construction is best shown in FIG. 2 which is an exploded view of the bipolar element 12. As shown, the element 12 includes a barrier 21 molded of a suitable plastic with a rim 22 which forms the compartments 23 and 24 on opposite sides of the barrier 21. Several plastic materials have been found suitable for molding the barrier including polyethylene, polypropylene, nylon, polyvinyl chloride, and epoxy resins. The compartments 23 and 24, formed by the intercell barrier 21 and the rim 22, provide electrolyte impermeable enclosures surrounding three sides of both the electrodes 12a and 12b which are shaped to fit therein. The barrier 21 is made conductive by incorporating therein a metallic grid 25 which is constructed so as to extend through both sides of the barrier 21 to contact the electrodes. If the barrier is made of an epoxy resin, the barrier 21 may be molded around the grid 25. If the barrier is made of polyethylene, the barrier may be heated and the grid pressed therein. The grid 25 may be made of woven screen or of an expended metal such as silver and preferably is constructed, as shown, of two pieces of such material welded together at 26 to insure good electrical contact between the parts.

In order to provide good electrical contact and continuity between the electrodes of the bipolar element through the grid 25, the conductive thermoplastic films 27 and 28 are included between the barrier 21 and the electrodes 12a and 12b respectively. The films 27 and 28 are preferably made of finely divided silver particles intimately dispersed throughout a matrix of polyethylene and subsequently compacted in order to obtain high conductivity.

Both the positive electrode 12a and the negative electrode 12b are structurized wafers of electrochemically active material shaped to fit into the compartments 23 and 24 of the bipolar element. The positive electrode 12a preferably consists of a spongy, porous mass of coherent finely divided particles of silver. One process for producing such an electrode is described in my co-pending application, Serial No. 243,933, filed August 28, 1951, now U.S. Pat. No. 2,881,237, granted April 7, 1959. As therein disclosed, this process comprises the impregnation of a combustible carbon base material such as filter paper, synthetic resins or cloth with a compound of silver such as silver nitrate. The combustible material is then burned at a temperature well below the melting point of silver to reduce the compound of silver to metallic silver and structurize it into a porous, cohering mass.

The negative electrode 12b, which may be zinc, is also a structurized wafer shaped to fit into the cups of the bipolar element 12. The electrode 12b may be structurized as by sintering a pressed wafer of zinc oxide. It may also comprise finely divided particles of metallic zinc homogeneously dispersed throughout a suitable binder. For some applications, it may be found desirable to homogeneously disperse mercuric oxide throughout the zinc electrode or to deposit a layer of mercuric oxide on the surfaces of the electrode 12b. For assembly of the bipolar element 12, the positive electrode 12a and the conductive film 27 are fitted into compartment 23 and similarly, the negative electrode 12b and the conductive film 28 are inserted into the compartment 24. To consolidate the parts thus assembled, the bipolar element is compressed at an elevated temperature. At the elevated temperature, the binder in the films 27 and 28 becomes thermoplastic and under the applied pressure unites the elements into a single unitary form. It should be noted, that the metallic silver in the films 27 and 28 aids in establishing contact between the active materials of the electrodes 12a and 12b and the grids 25. In addition, because of the ionic impermeability of the polyethylene binder and the contained conductive metal in the films 27 and 28, these films supplement the electrolyte impermeability of the barrier 21.

As shown in FIG. 1, the end cells 14 and 15 are similar in construction to the bipolar elements with the exception that each is adapted to house one electrode. The end cell 14 comprises a barrier 30 molded with a rim 31 which forms a compartment 32 adapted to house the negative electrode 14b. A conductive grid 33 is included in the barrier 30 and extends into the compartment 32 to contact the electrode 14b. Unlike the bipolar elements, however, the grid 33 does not extend through both sides of the barrier 30. A conductor 34, which is electrically connected to the grid 32 at 35, as by welding, extends through the other side of the barrier 30 to form the negative terminal of the battery. The end cell 14 also includes a conductive thermoplastic film 36 which is identical to the films 27 and 28 described in connection with the bipolar element 12. Like the films 27 and 28, the film 36 as a result of a pressing operation at an elevated temperature serves to electrically and physically unite the elements of the end cell 14.

The end cell 15 is similar in construction to the end cell 14 and comprises the barrier 40 with the rim 41, the grid 43, the battery terminal 44, the conductive film 46 and the positive electrode 15a.

The separator means 16a, 16b, and 16c may be assemblies which include three elements. By way of example, the separator 16a is illustrated in greater detail in FIG. 3. The center element 16y comprises a porous carrier impregnated with an ion exchange resin. The porous carrier may be asbestos, polyethylene, polyvinyl chloride, or copolymers of polyvinyl chloride. The ion exchange resin may be produced by impregnating the porous carrier with the monomeric ingredients necessary to form a cross link polymeric ion exchange resin. For further details as to how to produce this element, reference may be had to my co-pending application, Serial No. 620,504, filed November 5, 1956, now U.S. Patent No. 2,965,697 granted Dec. 20, 1960, entitled "Battery Diaphragm." As explained in this application, the ion exchange resin is distributed homogeneously throughout the porous carrier and the resultant continuous phase thereof results in the element 16y being transparent.

The elements 16x and 16z, on the opposite sides of the element 16y, are resilient, compressible, and highly porous elements, preferably of microporous polyethylene. These elements are preferably made in accordance with the disclosure of my Patent No. 2,676,929. It will be apparent to those skilled in the art, however, that the elements 16x and 16z may be made of some other porous material and that, in addition, the separator means 16a, 16b, and 16c may be of a conventional type.

The manner in which the end cells, bipolar elements, and separator means are assembled into a battery will now be described in connection with FIG. 1. As shown, the rims of the bipolar elements 12 and 13 and the rims of the end cells 14 and 15 are threaded. Thus, each of these elements is adapted to be screwed into a threaded cylindrical casing 51 with the separator means 16a, 16b, and 16c between adjacent positive and negative plates. In this manner, a plurality of electrolytic cells are formed consisting of the alternate positive and negative electrodes of the bipolar elements.

The casing 51 may be molded of any suitable plastic such as those adapted to be used for molding the barrier 21. When assembled, the end cells 14 and 15 and the casing 51 provide a completely sealed housing for the battery of the present invention. If the casing 51, the end cells 14 and 15, and the bipolar elements 12 and 13 are molded of an epoxy resin, the threads on these elements may be coated with the resin just prior to assembly so that upon hardening, the assembled parts will be bonded together to insure a gas and moisture tight seal between the elements. If the casing 51, the end cells and bipolar elements are molded of another plastic, the threads on these elements may be coated with a suitable solvent for that plastic to provide a bond between the assembled parts.

The battery of the present invention can also be encapsulated. For encapsulation, the elements are assembled and then placed in a mold into which the encapsulating resin is introduced to form the container 51 in situ around the elements. For this purpose, encapsulating materials of various kinds can be used. By way of illustration and example and not by way of limitation, a polymerizable resin such as an epoxy resin may be used. This resin composition has the characteristic of slight shrinkage upon curing which maintains the elements of the battery under compression after sealing.

While polymerizable resins of the epoxy type are available as liquid which makes for ease of encapsulation, it should be understood that other resins, inert to the materials and reactions which take place within the battery, may be used. For example, polyethylene may be molded around and about the battery assembly to encapsulate it and provide the container 51. Polystyrene, polypropylene, or polyvinyl chloride are equally suited.

The thickness of the container 51 may be made adequate to resist any tendency for the container to change dimensionally during the charging and discharging of the electrodes. In this respect, several features of the battery of the present invention are designed to absorb the dimensional changes of the electrodes which accompany charging and discharging. For example, the outside elements of the separator means are resilient by virtue of their porosity. In addition, the bipolar elements, being plastic, are resilient to a degree. These features, in combination with the stress applied by the container 51, tends to offset any discontinuity which tends to occur either in the electrode structure on in the electrical contact originally established between the elements with a result of the volumetric changes of the electrodes which accompany charging and discharging. The exact thickness will vary depending on the size of the assembly, its length, and the like. For example, for an assembly such as illustrated in FIG. 1, in which the barrier is 0.03 inch in thickness and the electrodes are approximately 1.75 inches in thickness and 0.1 inch in diameter, a casing of about 0.125 inch in thickness will be adequate.

The electrodes of the bipolar elements and end cells may be formed prior to assembly and encapsulation or, preferably, the electrochemical formation of the electrodes is carried out after the elements have been assembled and encapsulated. If the electrochemical formation is carried out after encapsulation, the separator means 16a, 16b, and 16c and the battery electrodes are saturated with electrolyte prior to their assembly and encapsulation. Conventional alkaline electrolytes have been found suitable for this purpose as for example, a 30 to 40 percent solution of potassium hydroxide. For charging, the battery terminals 34 and 39 are connected to a suitable source of charging current. Conventional charging rates can be used. During charging, oxygen will tend to be evolved at the positive electrode. Such oxygen as may appear, however, tends to recombine with the silver or silver oxide and thus, minimizes any rise of gas pressure within the sealed battery. If any hydrogen is evolved, it will be diffused through the container 51 since it is impossible to retain hydrogen in containers made from the types of encapsulating resins described hereinbefore.

For charging the plates of the bipolar elements 12 and 13 prior to assembly, the elements may be placed in a suitable electrolyte with suitable separation and the plates charged against appropriate dummy electrodes in the conventional manner. This same is ture for the end cells 14 and 15.

The construction of the battery of the present invention is designed to provide extremely efficient operation in terms of energy available in proportion to the weight of the battery. In order to achieve this high efficiency, the bipolar elements and end cells have been designed to utilize an optimum quantity of active material for the electrodes with a minimum possibility of intercell electrolyte leakage. To this end, the electrode compartments in the end cells and bipolar elements provide housings for the electrodes which surround the electrodes on three sides. In a battery assembly, the separators cooperate in contacting these compartments, completely immobilizing the active material of the electrolyte. In addition, the threaded construction provides a maximum path to impede electrolyte leakage between adjacent cells. Still further, the construction restricts the physical exchange of electrolyte between the plates of opposite polarity by electroendosmatic action.

Having described the present invention, that which is claimed as new is:

1. A pile type battery comprising in combination a plurality of bipolar elements, each of said elements comprising a positive electrode and a negative electrode separated by an electrolyte impermeable barrier having compartments on each side thereof for housing said electrodes said barrier being made of plastic having embedded therein a metallic conductive grid extending through said barrier to contact said positive and negative electrodes, a pair of end cells each comprising an electrolyte impermeable barrier having a compartment on one side thereof for an electrode, said end cell barriers being made of plastic having a metallic conductive grid embedded therein, one of the said end cells housing a positive electrode in contact with said grid and the other of said end cells housing a negative electrode in contact with said grid, separator means between adjacent bipolar elements and end cells whereby a plurality of electrolytic cells consisting of alternate positive and negative plates of said end cells and bipolar elements are formed, said end cells and said bipolar elements being threaded, and a threaded housing surrounding said end cells and said bipolar elements whereby said plurality of electrolytic cells are contained.

2. A pile type battery as specified in claim 1 wherein an electrically conductive film comprising finely divided metallic particles dispersed throughout a thermoplastic binder is interposed between each of said electrodes and its respective electrolyte impermeable barrier.

3. A pile type battery as specified in claim 1 wherein said electrolyte impermeable barriers and end cells are made from a plastic selected from the group consisting of polyethylene, epoxy resin, polypropylene, polystyrene, and polyvinyl chloride.

4. A pile type battery as specified in claim 1 wherein said positive electrodes are silver and said negative electrodes are zinc.

References Cited in the file of this patent

UNITED STATES PATENTS

| | | |
|---|---|---|
| 1,348,467 | Adams | Aug. 3, 1920 |
| 1,712,897 | Morrison | May 14, 1929 |
| 2,575,337 | Ellis | Nov. 20, 1951 |
| 2,620,369 | Daniel | Dec. 2, 1952 |
| 2,626,295 | MacFarland | Jan. 20, 1953 |
| 2,684,989 | Wilburn | July 27, 1954 |
| 2,818,462 | Solomon | Dec. 31, 1957 |
| 2,824,165 | Marsal | Feb. 18, 1958 |
| 2,852,591 | Ruben | Sept. 16, 1958 |
| 2,853,537 | Corren | Sept. 23, 1958 |
| 2,870,235 | Soltis | Jan. 20, 1959 |

FOREIGN PATENTS

| | | |
|---|---|---|
| 569,482 | Great Britain | May 25, 1945 |